(12) United States Patent
Jousma et al.

(10) Patent No.: US 11,890,568 B2
(45) Date of Patent: Feb. 6, 2024

(54) AIR PURIFIER FILTER SYSTEM, AN AIR PURIFIER AND A METHOD FOR CONTROLLING AN AIR PURIFIER

(71) Applicant: KONINKLIJKE PHILIPS N.V., Eindhoven (NL)

(72) Inventors: Hendrik Richard Jousma, Eindhoven (NL); Declan Patrick Kelly, Eindhoven (NL); Einte Holwerda, Eindhoven (NL); Jean-Paul Jacobs, Eindhoven (NL); Cornelis Reinder Ronda, Eindhoven (NL); Jean Bart Bleeker, Eindhoven (NL); Koray Karakaya, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 538 days.

(21) Appl. No.: 15/534,212

(22) PCT Filed: Dec. 15, 2015

(86) PCT No.: PCT/EP2015/079690
§ 371 (c)(1),
(2) Date: Jun. 8, 2017

(87) PCT Pub. No.: WO2016/096786
PCT Pub. Date: Jun. 23, 2016

(65) Prior Publication Data
US 2017/0341001 A1 Nov. 30, 2017

(30) Foreign Application Priority Data
Dec. 18, 2014 (WO) ................ PCT/CN2014/094271
Jan. 26, 2015 (EP) ..................................... 15152444

(51) Int. Cl.
*B01D 46/00* (2022.01)
*B01D 46/42* (2006.01)
(Continued)

(52) U.S. Cl.
CPC ....... *B01D 46/0086* (2013.01); *B01D 46/009* (2013.01); *B01D 46/429* (2013.01);
(Continued)

(58) Field of Classification Search
None
See application file for complete search history.

(56) References Cited

U.S. PATENT DOCUMENTS

| 6,635,277 B2 | 11/2003 | Franz | |
| 2008/0295685 A1* | 12/2008 | Uhland | ............... B01D 46/2411 95/25 |
| 2011/0023709 A1 | 2/2011 | Bosshard | |
| 2011/0024337 A1 | 2/2011 | Kreibig | |

(Continued)

FOREIGN PATENT DOCUMENTS

| CN | 102218245 A | 10/2011 |
| CN | 203916332 U | 11/2014 |

(Continued)

OTHER PUBLICATIONS

Lowe's product page, "Filtrete 1900 MPR Premium Allergen", All Pages https://web.archive.org/web/20210125065309/https://www.lowes.com/pd/Filtrete-1900-MPR-Maximum-Allergen-Common-20-in-x-25-in-x-1-in-Actual-19-6-in-x-24-7-in-x-0-7810-in-Electrostatic-Pleated-Air-Filter/3130397 (Year: 2021).*

(Continued)

*Primary Examiner* — Christopher P Jones
*Assistant Examiner* — Brit E. Anbacht
(74) *Attorney, Agent, or Firm* — Schott, P.C.

(57) ABSTRACT

An air purifier filter system comprises an air purifier filter unit and a machine readable identifier which provides information concerning the filter unit type and performance (Continued)

information specific to a target pollutant to be filtered by said air purifier filter unit from a plurality of different pollutants that can be filtered by that filter unit type. This information can be used to provide an end of life prediction for the filter unit or provide advice that the filter should be changed for other reasons. This enables the user to be given advance warning, and to be given instructions when it is time to change the filter unit. The instructions to change the filter unit may be more accurate than a simple timer as they can take account of the type of filter unit and the performance information. In some examples the use history of the filter unit may also be used to predict the time when it should be changed.

16 Claims, 2 Drawing Sheets (51) Int. Cl.
| | | |
|---|---|---|
| *B01D 46/44* | (2006.01) | |
| *F24F 11/62* | (2018.01) | |
| *F24F 11/39* | (2018.01) | |
| *F24F 11/30* | (2018.01) | |
| *B01D 53/00* | (2006.01) | |
| *G05B 19/12* | (2006.01) | |
| *F24F 110/64* | (2018.01) | |
| *F24F 110/50* | (2018.01) | |

(52) U.S. Cl.
CPC ............. *B01D 46/44* (2013.01); *B01D 53/00* (2013.01); *F24F 11/30* (2018.01); *F24F 11/39* (2018.01); *F24F 11/62* (2018.01); *G05B 19/124* (2013.01); *F24F 2110/50* (2018.01); *F24F 2110/64* (2018.01); *G05B 2219/23363* (2013.01)

(56) References Cited

U.S. PATENT DOCUMENTS

| | | | |
|---|---|---|---|
| 2011/0036145 A1* | 2/2011 | Dobbyn | B08B 15/023 73/31.05 |
| 2011/0308308 A1 | 12/2011 | Herman | |
| 2012/0085231 A1* | 4/2012 | Kristensson | F24F 11/30 95/14 |
| 2012/0151889 A1* | 6/2012 | Horey | B01D 46/10 55/467 |
| 2013/0146052 A1 | 6/2013 | Ding | |
| 2013/0220900 A1* | 8/2013 | Milvert | B01D 35/143 210/85 |
| 2016/0097311 A1* | 4/2016 | Coelho Ferreira | B03C 3/41 422/119 |
| 2016/0273471 A1* | 9/2016 | Shimpi | F02D 41/26 |
| 2017/0328591 A1* | 11/2017 | Kelly | B01D 46/46 |
| 2018/0140989 A1* | 5/2018 | Arthur | B01D 46/10 |
| 2019/0209957 A1* | 7/2019 | Silvestro | B01D 46/429 |
| 2019/0255476 A1* | 8/2019 | Silvestro | B01D 46/2411 |
| 2020/0030731 A1* | 1/2020 | Dhau | B01D 53/007 |

FOREIGN PATENT DOCUMENTS

| | | | |
|---|---|---|---|
| FR | 2898964 A1 | 9/2007 | |
| JP | S63-137718 A | 6/1988 | |
| JP | 2011-191017 A | 9/2011 | |
| JP | 2013022539 | 2/2013 | |
| KR | 20040034037 A | 4/2004 | |
| RU | 2438758 C1 | 1/2012 | |
| RU | 2012121955 A | 12/2013 | |
| WO | 2012018766 A2 | 2/2012 | |
| WO | 2012066453 A1 | 5/2012 | |

OTHER PUBLICATIONS

EPA, "Development of Performance Data for Common Building Air Cleaning Devices: Final Report", US EPA, EPA/600/R-08/013, Dec. 2008, pp. 50-55, 64 and 65, p. 78-79 part 6.4 "Results from Aging Evaluations of "Off-the-Shelf " Filters" (Year: 2008).*

* cited by examiner

AIR PURIFIER FILTER SYSTEM, AN AIR PURIFIER AND A METHOD FOR CONTROLLING AN AIR PURIFIER

This application is the U.S. National Phase application under 35 U.S.C. § 371 of International Application No. PCT/EP2015/079690, filed on Dec. 15, 2015, which claims the benefit of International Application No. PCT/CN2014/094271 filed on Dec. 18, 2014 and International Application No. 15152444.4 filed Jan. 26, 2015. These applications are hereby incorporated by reference herein.

FIELD OF THE INVENTION

This invention relates to air purifiers.

BACKGROUND OF THE INVENTION

It is desirable to replace filters in air purifiers, in order to ensure continuous product performance.

Replacement filters may be used to tailor the air purifier performance to the specific needs of the particular air purifier. For example, there may be different filters targeting different pollutants (e.g. a new home filter for formaldehyde), and over time the consumers' requirements may change.

As more sophisticated sensing is added to air purifiers as well as additional information relating to environmental sensing, new pollutants may emerge that require new filter technology to be treated. Furthermore, sensing approaches may enable the consumer to choose a filter stack that is optimized for their needs, for example based on their specific pollution conditions. This will lead to a variety of filters that can be used with the same air purifier, and resulting in changing of the filter at various times.

It is known that filter regeneration may prolong the operational lifetime of some types of filter. Again, this results in the changing of the filter at various times.

A user thus needs to make a judgment as to when to change a filter. In the case of a regenerated filter, the expected performance and lifetime of these filters may change with each regeneration step.

Current air purifiers tell the consumer when to change the filter, based on the air flow that has taken place over time through the filter. In some cases, only a timer is used. For a variety of filters, this simple method to determine a suitable replacement time is not sufficient. Similarly, with regenerated filters, the replacement time may change depending on the number of previous regenerations. Furthermore, it would be desirable for a device to be able report in more detail on the current filter performance.

KR 2009 01336 discloses an air cleaner filter exchange time indicator, which is based on the driving time of a fan of the air cleaner.

There is therefore a need for a system which provides more intelligent analysis of when filter replacement is appropriate, so that the full lifetime of a filter can be used to reduce wastage, and also to ensure that air purifier performance is maintained.

SUMMARY OF THE INVENTION

The invention is defined by the claims.

According to examples in accordance with an aspect of the invention, there is provided an air purifier filter system, comprising:

an air purifier filter unit; and a machine readable identifier, wherein the identifier provides information concerning the filter unit type and performance information specific to a target pollutant to be filtered by the air purifier filter unit from a plurality of different pollutants that can be filtered by that filter unit type, which information can be used to provide advice on changing the air purifier filter unit based on said filter unit type and said performance information.

By reading information from the filter unit which relates to the type of filter unit and performance information relating to a specific pollutant, it becomes possible for an air purifier to predict the end of life of the filter unit or to determine other times at which the filter should be changed. This enables the user to be given advanced warning, and to be given instructions when it is time to change the filter unit. Thus, in some examples, the identifier provides information which can be used to provide an end of life prediction for the filter unit.

In some examples, the identifier may be a read-only source of information, for example as simple as a bar code or identification number. The instructions to change the filter unit may be more accurate than a simple timer as they can take account of the type of filter unit. The end of life prediction may also take into account other information, such as the pollutants which are being filtered. As a minimum, the information may simply indicate the type of filter, and an external data source can then be interrogated to enable the lifetime to be derived. Alternatively, the identifier may include all information required to predict the end of life without needing further information sources to be used. The identifier may for example include all the key properties of the filter.

The use history of the filter unit may also be used to predict the end of life. Each filter unit preferably has a unique identifier, so that use history can be stored in an air purifier which is associated with that particular filter unit. This use history can then be interrogated when the particular filter unit is identified. This approach enables use history to be taken into account even with a read-only identifier.

The machine readable identifier is for example electronically, by radio waves or optically readable. An electronically readable identifier may be a memory device, and an optically readable identifier may be a (linear or 2D) bar code or other visual pattern.

The identifier may provide information which can be used to provide performance information specific to a subset of a plurality of different pollutants and to provide advice on changing the air purifier filter unit based on said performance information specific to that subset.

This performance information may for example indicate the expected lifetime when used with a specific pollutant, or an average expected lifetime when used with a default set of pollutants. The lifetime prediction can thus take account of the pollutants to which the filter unit is being exposed.

The identifier may for example provide information which can be used to provide suitable fan speeds for a plurality of different situations.

In this way, the fan speed of an air purifier can be controlled depending on the type of filter and the situation, to provide the most effective use of the filter unit and control the noise generated by the purifier using the filter unit.

The identifier is for example machine writable such that the information can be updated in response to usage of the filter unit. The machine writable identifier is for example writable electronically or by using radio waves.

By providing a machine writable identifier, the history information can be stored locally on the filter unit itself, rather than being stored on the air purifier. This enables the filter unit to be used in different air purifiers. The history information enables the filter unit to be swapped over before its end of use, for example if a different type of filter unit is more suitable at a particular time. The partially-used filter unit can then be re-used at a different time, and the correct end of life information is maintained.

The identifier may provide information which can be used to determine applicability of the filter unit to different environmental conditions.

These environmental conditions may for example be temperature, humidity, the season, or the pollutants that are present. For example, some allergens (e.g. pollen) occur predominately in specific seasons per geographic area. Thus, filter units can be swapped over when the environmental conditions indicate that a filter change is appropriate.

Examples of the invention also provide an air purifier, comprising:

a fan;

a housing for receiving an air purifier filter unit;

a read circuit for reading a machine readable identifier of the air purifier filter unit or an input for receiving information read from a machine readable identifier of the air purifier filter unit; and a processor which is adapted to derive information from the machine readable identifier concerning the filter type and performance information specific to a target pollutant to be filtered by said air purifier filter unit from a plurality of different pollutants that can be filtered by that filter unit type, and to derive advice on changing the air purifier filter unit based on said filter unit type and said performance information.

This air purifier is adapted to receive a filter unit as defined above. It receives the information from the identifier to determine the end of life of the filter unit or to derive information relating to the need to change the filter unit for other reasons. If a read circuit is provided, it may be integrated into the air purifier. However, the reading of the identifier may be carried out remotely, for example using an application on a smart phone or tablet. This read out information is then provided to the air purifier as an input.

The processor may then be adapted to determine performance information specific to a subset of a plurality of different pollutants from the machine readable identifier. The processor may also or instead be adapted to determine suitable fan speeds for a plurality of different situations from the machine readable identifier.

A write circuit may be provided for writing information to the identifier which is indicative of the usage of the filter unit. By writing information to the identifier of the air purifier filter unit, it can be used by different air purifiers and the correct end of life prediction, taking into account previous usage, can be derived.

One or more external sensors may be provided for detecting environmental conditions or an input may be provided for receiving information from one or more external sensors for detecting environmental conditions, wherein the processor is adapted to determine the applicability of the filter unit to different environmental conditions.

The air purifier may provide advice to a user either to change a filter unit because it has reached the end of its life, or to swap filter units because a different filter unit has become more suitable for use at that particular time.

The read circuit is in one example part of the air purifier. Alternatively, a wireless transceiver may be provided for receiving wirelessly the information read from the machine readable identifier of the air purifier filter unit. The air purifier may of course be combined with the air purifier filter unit defined above to provide an air purifier with loaded filter unit.

Examples in accordance with another aspect of the invention provide a method of controlling an air purifier, comprising:

reading a machine readable identifier of an air purifier filter unit, wherein the identifier provides information concerning the filter type and performance information specific to a target pollutant to be filtered by the air purifier filter unit from a plurality of different pollutants that can be filtered by that filter unit type; and deriving advice on changing the filter unit based on the filter unit type and said performance information.

This method enables a user to be instructed to change a filter unit at the most appropriate time.

The method may further comprise writing to the machine readable identifier to update the information in response to usage of the air purifier filter unit.

This enables the filter unit to be removed from an air purifier before its end of life, and to be re-used later. Deriving advice on changing the filter unit may also comprise taking into account environmental information.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides an air purifier filter system, comprising an air purifier filter unit and a machine readable identifier which provides information concerning at least the filter unit type. This information can be used to provide an end of life prediction for the filter unit. The air purifier can thus predict the end of life of the filter unit. This enables the user to be given advance warning, and to be given instructions when it is time to change the filter unit. The instructions to change the filter unit may be more accurate than a simple timer as they can take account of the type of filter unit. In some examples the use history of the filter unit may also be used to predict the end of life.

Figure 1:
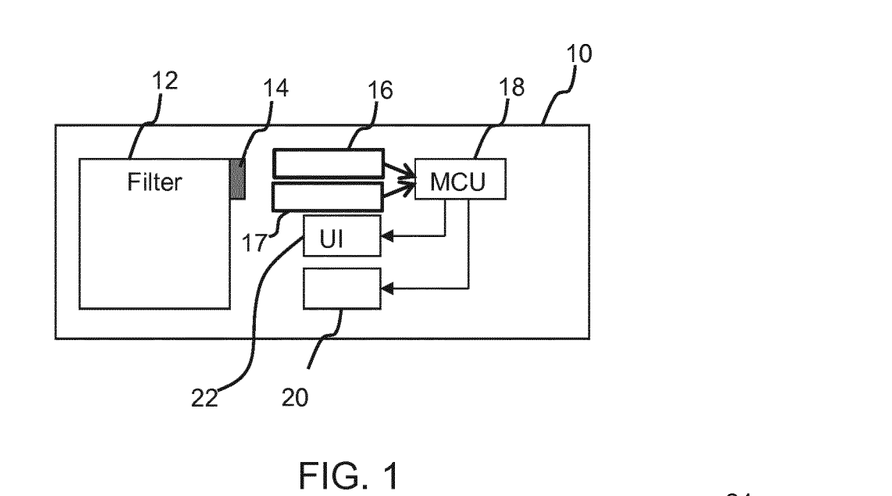
FIG. 1 shows a first example of air purifier system.

FIG. 1 shows a first example of air purifier 10, which houses a replaceable filter unit 12. The filter unit 12 has a machine readable identifier 14 which provides information concerning at least the filter unit type. The air purifier has a reader 16 for reading the machine readable identifier 14, and this may be an electronic reader circuit or an optical reader circuit, or a mechanical read circuit or a radio wave based reader circuit (such as an RFID based system). The read information is provided to a master control unit ("MCU") which controls a fan 20 and has a user interface 22 for at least providing output information to a user.

As discussed below, the system optionally also has a writing circuit 17 for updating a writable identifier 14.

When the filter unit 12 is installed in the air purifier 10, the reader 16 reads the identifier 14 and transfers the data to the MCU 18. In the standalone case of FIG. 1, the MCU 18 uses the identifier data to control the user interface 22, for example to identify when the filter unit needs to be changed and to control the fan 20, for example based on a mode of operation such as a low noise mode or a powerful filtering mode.

In the example of FIG. 1, all required information to make an end of life prediction is stored on the identifier 14.

Figure 2:
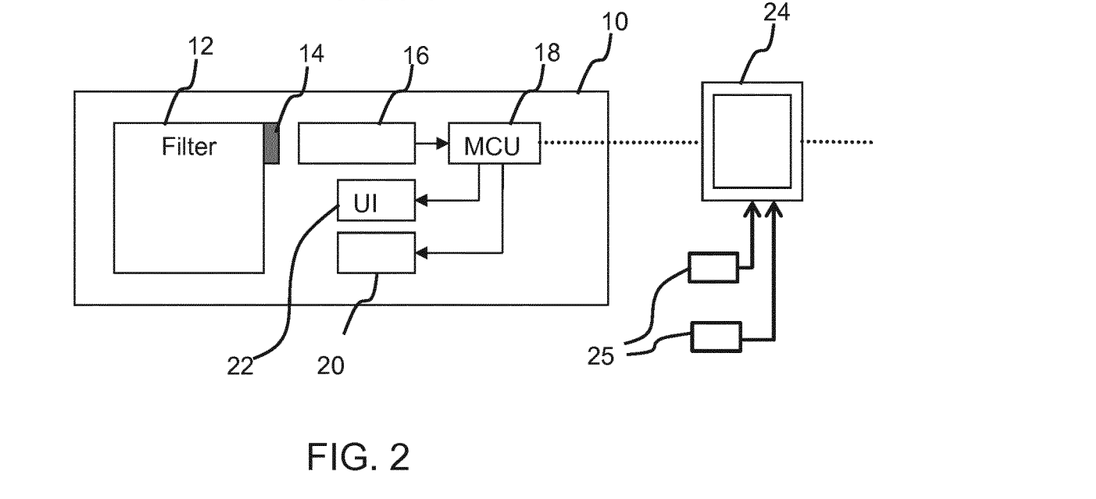
FIG. 2 shows a second example of air purifier system.

FIG. 2 shows an example in which there is a connection between the MCU 18 and an external data source 24 which is implemented as an application running on an external device. Alternatively, the external source could be on a remote web server accessed through the Internet either directly from the air purifier (e.g. via local WiFi) or via an application running on an external device. The other components are the same as in FIG. 1 and are given the same reference numbers.

FIG. 2 also shows that external sensors 25, for example for detecting indoor or outdoor environmental conditions, may also be used to provide information to the data source 24, or directly to the MCU (not shown).

The MCU can connect to the external application and provide the identifier data to the external application, which in return provides the required information to control the user interface and (optionally) the fan via the MCU.

In the standalone case of FIG. 1, the identifier or the air purifier must include the necessary data on the filter performance/lifetime. In the connected case of FIG. 2, the identifier may just indicate the filter type and the data can be retrieved from the connected application or through the Internet. The connected case allows the data for a particular filter type to be updated e.g. performance prediction refined, new pollutants added to the profile.

In the case of a non-recognized filter, the system may simply not work, for example by disabling the fan. Alternatively, the system may work in a default mode without the feature to indicate the filter lifetime and give no indication to the consumer about when to change the filter.

Figure 3:
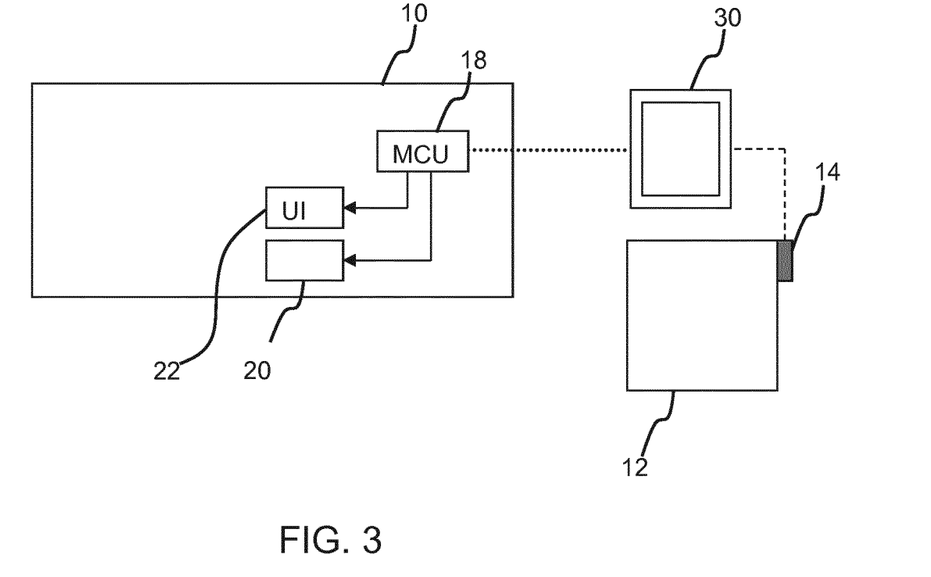
FIG. 3 shows a third example of air purifier system.

To support backwards compatibility with connected air purifiers that do not include the reader, the identifier 14 could be read directly from the filter by a connected device such as a phone or tablet.

This approach is shown in FIG. 3 wherein the air purifier 10 does not include a reader. The identifier 14 of the filter unit 12 can be read and optionally written by an external device 30 that is connected (wirelessly) to the air purifier 10. Preferably, the device 30 is a smartphone or tablet with a related application and the reading mechanism could be via a camera or RF-ID reader. The identifier and corresponding filter properties can be sent to the MCU of the air purifier from the (wirelessly) connected device 30.

In all cases, the identifier, is for example used to encode the following data items:

P1: Performance Profile

. . .

PN: Performance Profile

M1: Fan Speed

. . .

MP: Fan Speed where Pi is a specific pollutant. The performance profile indicates the filter performance over time for this specific pollutant. Mi is a mode identification (e.g. low noise, high power). The fan speed indicates the fan setting target optimized for this mode.

The performance profile may be very simple, for example just the lifetime of the filter based on cumulative air flow through the filter. For example, it could define the amount of the target pollutant that can be absorbed by the filter during its useful lifetime, referred to as the Cumulate Clean Mass (CCM). The profile is for example based on assuming average pollution levels. In this case, the profile is the same for all pollutants so only one profile is needed.

The performance profile may more preferably be based on a combination of cumulative air flow through the filter and measured values over time for the target pollutants. This enables the lifetime to be estimated based on the cumulative amount of pollutant through the filter as well as air flow. The measured pollutant value may be a specific pollutant or a combination (e.g. total volatile organic compounds, TVOC).

The performance profile may include not only cumulative levels of the target pollutant but also other interfering factors that affect the performance. For example the performance profile may take into account other pollutants that can affect the filter performance for a given target, or the ambient temperature, or relative humidity.

In a most simple implementation, the identifier 14 is read from the filter unit but is not written to. For some cases (e.g. high end professional applications) it may be beneficial to allow the air purifier to write to the identifier 14 as well as explained above, using the write circuit 17. This could allow the air purifier to update the performance profile on the identifier to take account of the actual usage (and therefore the reduced remaining lifetime). This could be useful in cases where the filters are swapped regularly from the air purifiers. This may be the case if filters with different properties are used in different cases with the same device. Also, if a filter is removed to be regenerated, it is beneficial to update the identifier to record the number of regeneration cycles.

A number of methods can be considered to provide machine readable filter identification (either individual filter identification or general filter type identification). Examples make use of optical fibers, color recognition, measurement of an electrical parameter such as resistance or inductance, light reflection properties, force measurement to determine a mechanical property, mechanical measurement of a pin configuration.

One specific example makes use of a simple barcode or 2D barcode which is used to read the filter type or the unique filter ID. Such a solution has the advantage of simplicity, but has the limitation that it can be very easy for a third party to copy the bar code.

An alternative solution is to use RF-ID tags on the filter as identifiers. In this case, an RF-ID reader (and optionally writer) is added to the air purifier. In the example of FIG. 2 (no reader/writer in the air purifier), the RF-ID tag can be read via a mobile phone and a connected application can be used to communicate the result to the air purifier. Furthermore, RF-ID tags can be used to implement security features as described below.

The identifier may be encrypted in such a way that third parties cannot generate a correct identifier. This can be used to give the user assurance that a correctly functioning filter is used and that the end of life prediction is accurate. For example each filter may be uniquely identified and an identifier stored in an encrypted form. In a connected solution (connected to a server), the server can determine that duplicate filters are being used. A variation is to combine encryption with a Physically Uncloneable Function (PUF) where the PUF is read from the physical properties of the filter and then stored encrypted in the identifier. The PUF can be encrypted (by private key) and stored on the identifier label so that a third party could not create a valid PUF/encrypted combination. A variation of this is where the PUF is not directly a function of the filter unit but is attached as part of the ID tag.

If the air purifier contains a small chip, which can be powered and read out from the purifier through electrical connections or radio waves, the air purifier can use a challenge/response to confirm that the filter is authentic, for example, using public/private encryption keys.

Different encryption solutions can be used for different price points.

As mentioned above, if a single air purifier can use different filters, it may be appropriate to change filters before a filter needs replacing but because the conditions have changed so that a different filter is more appropriate, for example for reasons of efficiency or ability to filter the present pollutants. In this way, the filter change/replacement criteria may not be related only to filter lifetime. The performance profiles are evaluated by the air purifier to recommend filter change/replacement to the user for reasons other than filter lifetime. By tracking the history of individual filters, it becomes possible to enable removal and later replacement of the filter in a purifier while maintaining a history of the usage to enable correct lifetime estimation.

The filter change/replacement criteria beyond lifetime should be specified for the filter. The criteria may take the form of conditions based on local sensors for example in the home, input from connected devices in the home, and external measurements such as weather conditions or an air quality index "AQI". The criteria will include what should happen once the conditions are met, which could be to replace the filter but keep for future use, or to remove the filter and discard.

For example, based on a seasonal change, as determined either by calendar date and/or by changes in temperature and/or humidity, a filter can be taken out and replaced with a filter optimized for the new conditions. The calendar date provides indication of an expected change of season, and this can be combined with weather conditions and/or internal conditions to determine the time for a seasonal filter change.

To enable filters to be removed and later replaced in the air purifier, the filter history can be tracked so that accurate lifetime assessment can be maintained. A unique identifier on the filter that is readable by the air purifier (or connected device) enables this tracking. In this way, the purifier can record the history of the filter so that if it is switched out and in again, the air purifier can accurately track the lifetime.

In a home with multiple purifiers, there is the possibility to move filters between purifiers, complicating the tracking of the filter usage. This can be addressed by having a method to update the identifier on the filter or in the case of connected devices, the history can be stored centrally in a connected application.

Tracking filters does not require changes to the air purifier. This tracking could for example be implemented using a mobile device (tablet or smartphone) that reads the identifier on the filters.

Thus, filter replacement may be prompted based on:

the season (e.g. to switch filter in summer to use a filter optimized for high humidity)

the weather forecast (e.g. as above for high/low humidity)

the outdoor AQI (e.g. high particular matter levels or pollen levels)

the indoor air quality profile (e.g. higher pollution emissions from furniture during hot weather)

user behavior change (e.g. change in ventilation pattern)

potential undesired odor emissions of the filter (e.g. filter predicted to start emitting odor, linked to factors such as humidity)

potential safety issue (e.g. filter used in an environment with oil, such as from cooking, could be at risk of catching fire)

AQI forecasts (e.g. predicted high pollen count).

In most cases listed above, the filter can be removed and stored for future use. In case of odor/safety, it is not expected that the filter is reused.

The MCU of the system can thus not only indicate the expected end of life of the filter but also highlight to the user the expected need for a different filter and allow direct ordering. Furthermore, the system can show the user the status of their available filters (e.g. the predicted remaining lifetime).

When a filter is inserted into the air purifier, the air purifier or the remote application will read the identifier. If a new filter is identified, a record containing the filter id and filter type is created. During usage the filter history is stored with this id. If an old filter is used, record of this id is looked up and updated during usage to reflect the continued use of the filter. As in the example above of FIG. 3, the history can be maintained by a connected device and application, with the filter id read by the connected device and the filter history stored in the connected device and not the purifier.

For each filter, the criteria for exchange need to be indicated to the system. This can be done in a number of ways.

In one approach, the details are included in the filter identifier that is read by the air purifier or connected device. Alternatively, the filter type can be used to look up the criteria as stored in the purifier or connected device. Finally, the filter type can be used is used to look up the criteria through the Internet.

In each case, the air purifier or connected device will know for the currently used filter the criteria for replacement. If no criteria are defined in addition to lifetime (e.g. a legacy filter), the filter will only be replaced based on lifetime.

The replacement criteria can be defined in a number of formats. A simple option is as a set of conditions, which could take the form of a logic expression (e.g. A AND (B OR C)), with the interpretation that when the logic expression is TRUE, the condition is met and the filter should be recommended for replacement. A look up table can store the defined condition plus the relevant historical data to allow evaluation of the expression to determine if the condition is met.

For example, an expression for a seasonal filter could be:

$$RH_5 > 60\% \text{ AND } TE_5 > 30° \text{ C. AND } TI_5 > 24° \text{ C.}$$

Where $RH_5$ indicates the relative humidity average for the previous 5 days, $TE_5$ indicates the external temperature peak for the last 5 days and $TI_5$ indicates the internal temperature daytime average for the last 5 days.

The stored history in the look up table maintains the actual values of the relevant parameters (updated periodically) to allow evaluation of the Boolean conditions.

Once the logical condition is TRUE, the user is then notified to replace the filter. The reason to be shown to the user can be stored as part of the criteria.

In practice, switching filters too often will be a detractor to the user, so that filter change requests may be limited. Two use cases are for seasonal filters and for filter replacement when the filter starts to emit undesired odors.

In cities such as Shanghai, there is a large variation between summer and winter in terms of temperature and humidity. Also the user of heating and/or air conditioning effects the indoor environment. Furthermore, the user of humidifiers/dehumidifiers will also impact the indoor air condition. Depending on the technology used, the filter performance can be impacted by temperature and humidity.

Thus, seasonal filters may be used which are tailored to the particular seasons. In particular, to ensure optimum performance, the user may want to switch between summer and winter filters. In this use-case, the system would recommend the switch to the user based on the calendar date, actual sensor measurements and external weather reports/forecasts.

A filter may be replaced due to the expectation that it will emit odor even if the filtration performance is still acceptable. Odor emission can be estimated based on the lifetime of the filter plus the conditions during usage (pollution level, humidity) or based on lifetime plus current conditions (temperature, humidity).

Examples of different filter types which may be appropriate at different times are for removal of specific type of gasses such as formaldehyde or BTX (Benzene, Toluene, Xylene) or others, or removal of particles, such as like PM10, PM2.5 particle filtering or targeting seasonal allergens such as pollen.

There may also be different requirements for the air purifier performance at different times, for example a different balance between air performance (treatment rate in $m^3/h$) and sound power levels (in dB). There may be maximum sound power levels for low treatment rate filters (e.g. 60 dB max for filters with airflow<400 $m^3/h$) according to set standards.

This balance between air performance on one hand and sound production on the other hand means that a maximum motor fan RPM may be set for the most critical filter, whereas some loss in performance can be tolerated for other types of filter. By using the knowledge of the type of filter that is mounted in the air purifier, as discussed above, an optimal fan speed can be set based on the type of filter to assure the most optimal performance.

The filter identification also enables additional information such as error messages relating to the wrong filter being used, or a filter stack in the incorrect sequence, to be provided.

Figure 4:
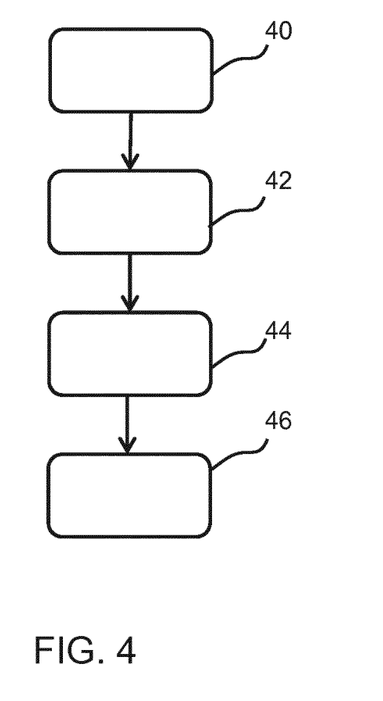
FIG. 4 shows an example of a method of controlling an air purifier.

FIG. 4 shows the method of controlling an air purifier.

In step 40, the machine readable identifier of an air purifier filter unit is read. The identifier provides information concerning at least the filter type.

In optional step 42, an appropriate fan speed setting is determined, and the fan speed is controlled.

In step 44 an end of life prediction for the filter unit is obtained based on the information. This may also take into account environmental information. This end of life prediction is then provided to the user as an output from a user interface.

In optional step 46, there is writing to the machine readable identifier to update the information in response to usage of the air purifier filter unit.

It will be clear from the different examples above that there are various options for the filter unit identifier. The different possibilities are summarized below.

In a first example it indicates the filter type but does not indicate properties of the filter. In the connected air purifier, the properties of the filter can the determined from external sources. For a fixed set of filter types, the properties can be stored in the air purifier.

In a second example it encodes the key properties of the filter necessary for the purifier to predict the lifetime and communicate with the consumer.

In a third example the identifier is furthermore used to monitor the operational history of the air filter and indicates the possibility to regenerate the filter (one or multiple times) or the necessity to replace it. This requires an identifier that can be updated by the air purifier. The filter unit identifier can be changed to indicate the number of recycling cycles, and any reduction in performance can then be deduced by the air purifier.

In a fourth example, each filter has a unique identifier, which allows monitoring of the operation history of the filter. The identifier may or may not be updatable. The history can for example be stored in the air purifier (and/or connected device) if the filter is only expected to be used by a single consumer. This may be the case for a single air purifier, or even for multiple air purifiers but with the same connected external device. Alternatively, the history can be stored in a remote server if the filter can be exchanged with other consumers.

The filter lifetime is determined to indicate to the consumer when to change the filter. However, this can be given for the filter stack as a whole or only for indicated filters or pollutants. Furthermore, the system can predict the remaining lifetime of the filter based on the known filter performance and typical pollutant levels recorded by the air purifier. The filter status and lifetime prediction can be communicated to the consumer (e.g. through the UI of a connected device).

As discussed above, embodiments make use of a controller 18. The controller can be implemented in numerous ways, with software and/or hardware, to perform the various functions required. A processor is one example of a controller which employs one or more microprocessors that may be programmed using software (e.g., microcode) to perform the required functions. A controller may however be implemented with or without employing a processor, and also may be implemented as a combination of dedicated hardware to perform some functions and a processor (e.g., one or more programmed microprocessors and associated circuitry) to perform other functions.

Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media such as volatile and non-volatile computer memory such as RAM, PROM, EPROM, and EEPROM. The storage media may be encoded with one or more programs that, when executed on one or more processors and/or controllers, perform at the required functions. Various storage media may be fixed within a processor or controller or may be transportable, such that the one or more programs stored thereon can be loaded into a processor or controller.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. An air purifier system, comprising:
   an air purifier filter having a filter type, wherein the air purifier filter is able to filter a plurality of different pollutants according to the filter type of the air purifier filter;
   a machine readable identifier attached to the air purifier filter, the machine readable identifier storing type information identifying the filter type of the air purifier filter for removal of a target pollutant and storing a performance profile indicating performance of the air purifier filter, over a period of time, specific to the target pollutant to be filtered by the air purifier filter from the plurality of different pollutants that can be filtered by the air purifier filter based on the filter type, wherein the indication of the performance comprises a combination of a cumulative air flow and a cumulative amount of the target pollutant through the air purifier filter over the period of time, and further wherein, the indication of the performance is used in estimating a lifetime of the air purifier filter for the target pollutant;
   a write circuit configured to update the performance profile stored on the machine readable identifier over the period of time as the air purifier filter removes the target pollutant; and
   a controller configured to indicate to a user when to change the air purifier filter based on the type information and the performance profile provided by the machine readable identifier when the air purifier filter is used for filtering the target pollutant.

2. The air purifier system as claimed in claim 1, wherein the controller is further configured to determine an end of life prediction for the air purifier filter based on the performance profile and the cumulative air flow through the air purifier filter.

3. The air purifier system as claimed in claim 1, wherein the performance profile includes performance information specific to a subset of the plurality of different pollutants, and wherein the controller is further configured to indicate to the user when to change the air purifier filter further based on the performance information specific to the subset.

4. The air purifier system as claimed in claim 1, further comprising a fan, wherein the machine readable identifier further stores mode identification information providing suitable fan speeds of the fan for a plurality of different situations, and wherein the controller is further configured to adjust a fan speed based on the stored mode identification information.

5. The air purifier system as claimed in claim 1, wherein the machine readable identifier further stores environmental information indicating applicability of the air purifier filter to different environmental conditions, and wherein the controller is further configured to indicate to the user, applicability of the air purifier filter to measured environmental conditions based on the stored environmental information.

6. The air purifier system as claimed in claim 1, wherein the performance profile is stored in an encrypted form in the machine readable identifier.

7. An air purifier, comprising:
   a fan;
   a housing for receiving an air purifier filter unit;
   a read circuit for reading a machine readable identifier of the air purifier filter unit or an input for receiving information read from the machine readable identifier of the air purifier filter unit, wherein the machine readable identifier stores type information identifying a filter type of the air purifier filter unit for removal of a target pollutant and stores performance information of the air purifier filter unit, over a period of time, specific to the target pollutant; and
   a processor which is adapted to derive information from the machine readable identifier concerning the filter type and the performance information specific to the target pollutant to be filtered by the air purifier filter unit from a plurality of different pollutants that can be filtered by the air purifier filter unit, wherein the performance information comprises a combination of a cumulative air flow and a cumulative amount of the target pollutant through the air purifier filter unit over the period of time, and further wherein, the performance information is used in estimating a lifetime of the air purifier filter unit for the target pollutant, a write circuit configured to update the performance profile stored on the machine readable identifier over the period of time as the air purifier filter unit removes the target pollutant, and to derive advice on changing the air purifier filter unit based on the filter type and the performance information for use when the air purifier filter unit is to be used for filtering the target pollutant.

8. The air purifier as claimed in claim 7, wherein the processor is adapted to determine performance information specific to a subset of the plurality of different pollutants from the machine readable identifier, and to provide the advice on changing the air purifier filter unit based on the performance information specific to the subset.

9. The air purifier as claimed in claim 7, wherein the processor is adapted to determine suitable fan speeds for a plurality of different situations from the machine readable identifier.

10. The air purifier as claimed in claim 7, further comprising one or more external sensors for detecting environmental conditions or an input for receiving information from one or more external sensors for detecting environmental conditions, wherein the processor is adapted to determine applicability of the air purifier filter unit to different environmental conditions.

11. The air purifier as claimed in claim 7, comprising a wireless transceiver for receiving wirelessly the information read from the machine readable identifier of the air purifier filter unit.

12. An air purifier system, comprising:
   a removable filter, wherein the removable filter is able to filter a plurality of different pollutants according to a type of the removable filter;
   a machine readable identifier attached to the removable filter that stores type information indicating the type of the removable filter for removing a target pollutant and storing a performance profile indicating performance, over a period of time, of the type of the removable filter for filtering the target pollutant from the plurality of different pollutants, wherein the indication of the performance comprises a combination of a cumulative air flow and a cumulative amount of the target pollutant through the removable filter over the period of time, and further wherein, the indication of the performance is used in an estimation of a lifetime of the removable filter for the target pollutant;
   a reader circuit configured to read the type information and the performance profile from the machine readable identifier;
   a write circuit configured to update the performance profile stored on the machine readable identifier over the period of time as the air purifier filter removes the target pollutant; and a controller configured to receive the type information and the performance profile from the reader circuit, to predict an end of life of the removable filter based on the received type information and the received performance profile for the target pollutant, and to notify a user via a user interface when to change the removable filter based on the predicted end of life of the removable filter.

13. The air purifier system of claim 12, further comprising:
a fan with an adjustable fan speed, wherein the machine readable identifier further stores mode identification information indicating suitable fan speeds for different situations, and wherein the controller is further configured to adjust a fan speed of the fan based on the stored mode identification information.

14. The air purifier system of claim 12, further comprising:
at least one sensor configured to measure at least one environmental condition, wherein the machine readable identifier further stores environmental information indicating applicability of the removable filter to different environmental conditions, and wherein the controller is further configured to indicate to the user via the user interface applicability of the removable filter to the measured at least one environmental condition based on the stored environmental information.

15. The air purifier system of claim 14, wherein the at least one environmental condition comprises at least one of temperature, humidity, or pollutants that are present.

16. The air purifier system of claim 12, further comprising:
at least one sensor configured to measure values over time for the target pollutant, wherein the controller is configured to predict the end of life of the removable filter further based on the measured values over time for the target pollutant.

* * * * *